US012074972B2

(12) United States Patent
Anslot et al.

(10) Patent No.: US 12,074,972 B2
(45) Date of Patent: Aug. 27, 2024

(54) METHOD FOR UPDATING A SECRET DATA IN A CREDENTIAL CONTAINER

(71) Applicant: THALES DIS FRANCE SAS, Meudon (FR)

(72) Inventors: Michel Anslot, Gemenos (FR); Jean-Yves Fine, Gemenos (FR)

(73) Assignee: THALES DIS FRANCE SAS, Meudon (FR)

( * ) Notice: Subject to any disclaimer, the term of this patent is extended or adjusted under 35 U.S.C. 154(b) by 34 days.

(21) Appl. No.: 17/270,605

(22) PCT Filed: Aug. 22, 2019

(86) PCT No.: PCT/EP2019/072512
§ 371 (c)(1),
(2) Date: Feb. 23, 2021

(87) PCT Pub. No.: WO2020/048787
PCT Pub. Date: Mar. 12, 2020

(65) Prior Publication Data
US 2021/0258156 A1    Aug. 19, 2021

(30) Foreign Application Priority Data
Sep. 5, 2018 (EP) .................... 18306170

(51) Int. Cl.
*H04L 9/08* (2006.01)
*H04L 9/06* (2006.01)
(Continued)

(52) U.S. Cl.
CPC .......... *H04L 9/0891* (2013.01); *H04L 9/0656* (2013.01); *H04L 9/3273* (2013.01);
(Continued)

(58) Field of Classification Search
CPC ... H04L 9/0891; H04L 9/0656; H04L 9/3273; H04W 12/0431; H04W 12/06; H04W 12/35
See application file for complete search history.

(56) References Cited

U.S. PATENT DOCUMENTS

| 10,534,931 | B2 * | 1/2020 | Rogers, Jr. .......... H04L 63/0428 |
| 2005/0182802 | A1 | 8/2005 | Beaudou et al. |

(Continued)

FOREIGN PATENT DOCUMENTS

| CN | 101583124 B | * | 6/2011 | |
| CN | 105052072 A | * | 11/2015 | .......... H04L 9/3228 |

OTHER PUBLICATIONS

International Search Report (PCT/ISA/210) and Written Opinion (PCT/ISA/237) mailed on Sep. 17, 2019, by the European Patent Office as the International Searching Authority for International Application No. PCT/EP2019/072512.

*Primary Examiner* — Ali S Abyaneh
*Assistant Examiner* — Lydia L Noel

(57) ABSTRACT

The invention is a method for updating a first secret data in a credential container including a subscriber identity module. The credential container comprises a set of secret parameters customized for a network operator and is configured to execute a symmetric mutual authentication algorithm using said set. The credential container receives from a remote server a second secret data enciphered using a second algorithm different from said symmetric mutual authentication algorithm and a subset of said secret parameters, the credential container deciphers the enciphered second secret data by using both the subset and a third algorithm and replaces the first secret data with the second secret data.

17 Claims, 3 Drawing Sheets

(51) Int. Cl.
*H04L 9/32* (2006.01)
*H04W 12/0431* (2021.01)
*H04W 12/06* (2021.01)
*H04W 12/30* (2021.01)

(52) U.S. Cl.
CPC ....... *H04W 12/0431* (2021.01); *H04W 12/06* (2013.01); *H04W 12/35* (2021.01)

(56) References Cited

U.S. PATENT DOCUMENTS

| | | | |
|---|---|---|---|
| 2010/0064344 A1* | 3/2010 | Wang | H04W 12/04 380/44 |
| 2010/0088518 A1* | 4/2010 | Dottax | H04W 12/35 713/175 |
| 2011/0119492 A1 | 5/2011 | Palanigounder et al. | |
| 2015/0163056 A1* | 6/2015 | Nix | H04L 63/0428 380/46 |
| 2017/0272944 A1* | 9/2017 | Link, II | H04L 9/0841 |
| 2019/0097794 A1* | 3/2019 | Nix | G06F 21/35 |
| 2021/0258781 A1* | 8/2021 | Anslot | H04W 8/265 |
| 2021/0314765 A1* | 10/2021 | Anslot | H04W 4/70 |

* cited by examiner

METHOD FOR UPDATING A SECRET DATA IN A CREDENTIAL CONTAINER

FIELD OF THE INVENTION

The present invention relates to methods of updating a secret data stored in a credential container. It relates particularly to methods of updating secret data by using a communication channel established between a remote server and a Telecom equipment.

BACKGROUND OF THE INVENTION

In order to securely connect a telecom communication network, a user equipment needs to be provisioned with full Telecom credentials known as the couple IMSI/Ki, where IMSI is a unique identifier of the telecom subscription and Ki a secret key uniquely allocated to the subscription by a mobile network operator.

The couple IMSI/Ki is usually stored in a tamper resistant element which may be a SIM card, a Universal Integrated Circuit Card (UICC), an embedded secure element (e.g. eUICC), a software secure enclave or a secure element integrated (i.e. iUICC) within a System On Chip (SOC).

A tamper resistant element is considered as secure because it is able to control the access to the data it contains and to authorize or not the use of its data by other machines or entities. Tamper resistant elements may also provide computation services based on cryptographic components (a.k.a. crypto processor). In general, tamper resistant elements have limited computing resources and limited memory resources and they are intended to be connected to a host machine which provides them with electric power. Tamper resistant elements may be removable or fixed to a host machine.

Due to security policies or user management policies, a network operator can need to update the secret values used by a device deployed on the field for authenticating to the communication network. Typically, a network operator may want to update the authentication key Ki of a UICC.

There is a need to securely update, in a tamper resistant element, the current secret data used to authenticate to a communication network.

SUMMARY OF THE INVENTION

An object of the invention is to solve the above mentioned technical problem.

An object of the present invention is a method for updating a first secret data in a credential container including a subscriber identity module. The credential container comprises a set of secret parameters customized for a network operator and is configured to execute a symmetric mutual authentication algorithm using said set. The credential container receives from a remote server a second secret data enciphered using a second algorithm different from said symmetric mutual authentication algorithm and a subset of said secret parameters. The credential container deciphers the enciphered second secret data by using both the subset and a third algorithm and replaces the first secret data with the second secret data.

Advantageously, the symmetric mutual authentication algorithm may be the Milenage algorithm as defined by ETSI TS 135.206 or the TUAK algorithm as defined by ETSI TS 135.231.

Advantageously, the second and third algorithms may be identical.

Advantageously, the second algorithm may take the first secret data as input parameter for generating the enciphered second secret data.

Advantageously, the second algorithm may be based on a one-time-pad encryption.

Advantageously, the first secret data may be used as a mask applied on the set to identify the subset.

Advantageously, the first secret data may be a subscriber authentication key.

Another object of the invention is a credential container comprising a processor and a first secret data and able to receive a message from a remote server. The credential container includes a subscriber identity module and comprises a set of secret parameters customized for a network operator. The credential container is configured to execute a symmetric mutual authentication algorithm using said set. The message comprises a second secret data enciphered using both a subset of said secret parameters and a second algorithm different from the symmetric mutual authentication algorithm. The credential container comprises an updating agent adapted to be run by the processor for deciphering the enciphered second secret data by using both the subset and a third algorithm and replacing the first secret data with the second secret data.

Advantageously, the symmetric mutual authentication algorithm may be the Milenage algorithm as defined by ETSI TS 135.206 or the TUAK algorithm as defined by ETSI TS 135.231.

Advantageously, the second algorithm may take the first secret data as input parameter for generating the enciphered second secret data.

Advantageously, the second algorithm may be based on a one-time-pad encryption.

Advantageously, the credential container may be a SIM, a UICC, a eUICC or an iUICC.

Another object of the invention is a server comprising a processor and able to send a message to a credential container including both a subscriber identity module and a first secret data. The server comprises a set of secret parameters customized for a network operator and is configured to execute a symmetric mutual authentication algorithm using said set. The server comprises a provisioning agent adapted to be run by the processor for generating a second secret data enciphered using both a subset of said secret parameters and a second algorithm different from the symmetric mutual authentication algorithm and for including the enciphered second secret data in said message, the second secret data being intended to replace the first secret data in the credential container.

Advantageously the second algorithm may be based on a one-time-pad encryption.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any type of credential container to be provisioned with new secret data.

Such a credential container may be a tamper resistant element like a SIM, a UICC, a eUICC, an iUICC, a MIM (Machine Identification Module) or a software secure enclave.

The credential container may be connected to a host device like a smartphone, a tablet, a personal computer, a smart watch, a vehicle, a meter, a slot machine, a TV or a computer for example.

Figure 1:
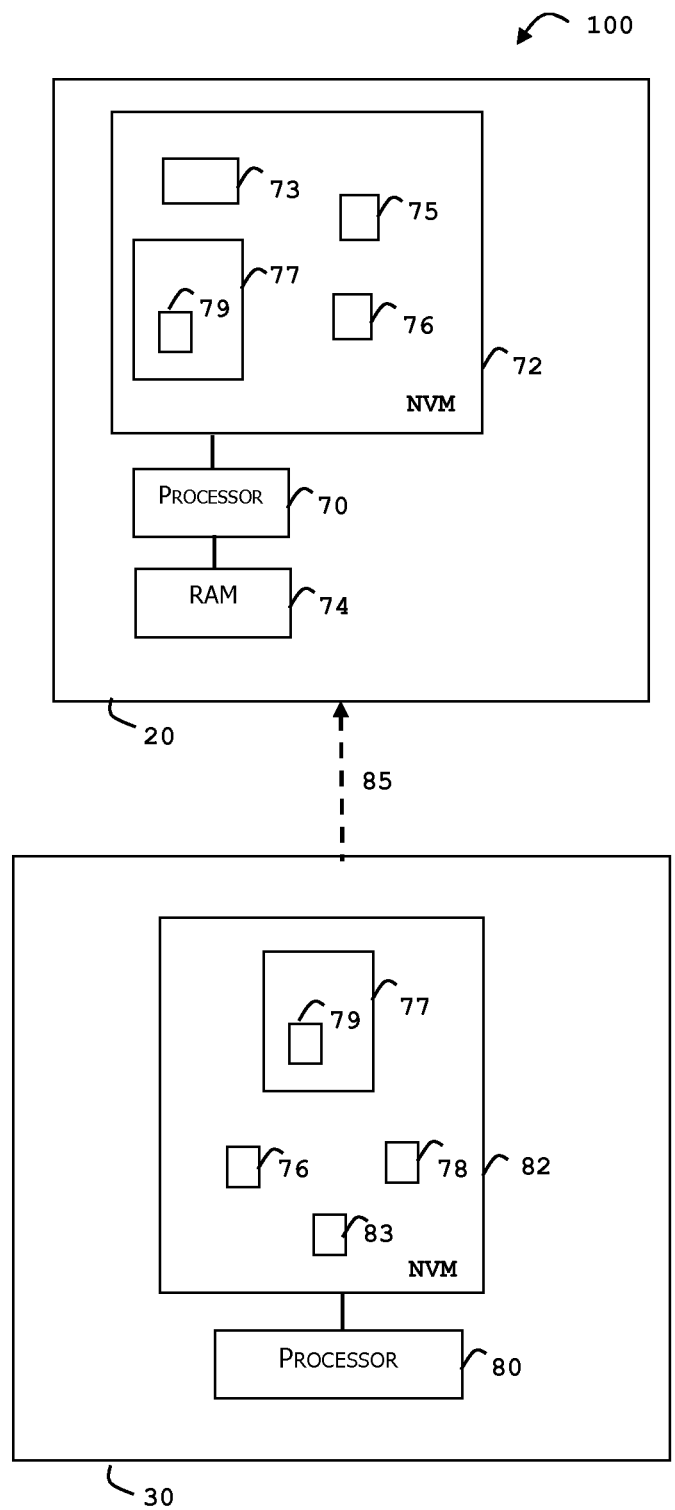
FIG. 1 depicts schematically a system comprising an example of credential container and an example of server according to the invention.

FIG. 1 shows schematically the architecture of a credential container 20 according to an example of the invention and the architecture of a remote server 30 according to an example of the invention. The system 100 includes both the credential container 20 and the server 30. In this example, the credential container is a UICC.

The server 30 can be an Authentication center (AuC) which is able to validate any attempt to connect a mobile communication network.

The credential container 20 comprises a processor 70, a working memory 74 (e.g. RAM) and a non-volatile memory 72. It is configured to communicate with the server 30 through command/response pairs.

The credential container 20 comprises a set 77 of secret parameters which have been customized for the network operator that manages a subscription installed in the UICC. These secret parameters are intended to be used to execute a symmetric mutual authentication algorithm in order to authenticate to a communication network. For instance, the secret parameters can include both the variables C1 to C5 and R1 to R5 as defined by ETSI TS 135.206 V9.0.0 (2010-02). The credential container 20 is configured to execute a symmetric mutual authentication algorithm using said set 77. In the example of FIG. 1, the credential container 20 comprises a software authenticating agent 75 which is adapted to be run by the processor 70 for authenticating to the remote server 30 using a symmetric mutual authentication algorithm. In a preferred embodiment, the symmetric mutual authentication algorithm is the Milenage algorithm as defined by ETSI TS 135.206 V9.0.0 (2010-02).

In another embodiment, the symmetric mutual authentication algorithm can be the TUAK algorithm as defined by ETSI TS 135.231 V12.1.0 (2014-10).

The authentication key Ki (i.e. secret data) 76 is stored in the non-volatile memory 72.

The credential container 20 is configured to receive, from the remote server 30, a message 85 that comprises a new secret data 78 which has been enciphered using both a subset 79 of the set 77 of secret parameters and an algorithm different from the symmetric mutual authentication algorithm.

The credential container 20 comprises an updating agent 73 adapted to be run by the processor 70 for deciphering the enciphered new secret data by using both the subset 79 and a deciphering algorithm and for replacing the secret data 76 (also named current secret data) with the new secret data 78.

Preferably, the ciphering algorithm used by the server 30 and the deciphering algorithm used by the credential container 20 are based on the one-time-pad encryption.

Alternatively the ciphering algorithm and the deciphering algorithm may be based on the Advanced Encryption Standard (AES).

The one-time-pad encryption is a cryptographic mechanism based on the use of a one-time pre-shared key (also named one-time-pad) which has a size longer than (or equal to) the length of the data to encipher. Each bit of the data to encipher is encrypted by combining it with the corresponding bit from the one-time pre-shared key using a modular addition.

For instance, the new secret data may be enciphered by the server 30 as follows:

Enciphered secret data=current secret data $\oplus$ new secret data $\oplus$ C1 $\oplus$ C2 $\oplus$ C3 $\oplus$ C4 $\oplus$ C5;

where $\oplus$ stands for the bitwise exclusive-OR operation.

This way, the new secret data 78 is enciphered with a one-time value based on both the value of the current secret data 76 (also named current secret data) and the variables C1 to C5 of the Milenage algorithm.

Then the new secret data 78 can be deciphered by the credential container 20 using the same algorithm:

New secret data=enciphered secret data $\oplus$ current secret data $\oplus$ C1 $\oplus$ C2 $\oplus$ C3 $\oplus$ C4 $\oplus$ C5.

In the above presented example, the subset 79 includes the variables C1 to C5 only.

In one embodiment, the subset can be predefined in both sides: Server and credential container.

In another embodiment, the subset definition may be sent from the server 30 to the credential container. For instance the message sent by the server to the credential container may include both the enciphered secret data and the definition of the subset 79.

In another embodiment, the subset can be defined using the content of the secret data 76. For instance, the secret data 76 may be used as a mask applied on the set 77. Let's assume that the 10 first bit of the secret data 76 are 0100010011, and that the set 77 if the ordered list of Milenage parameters C1, . . . , C5, R1, . . . , R5. By applying the mask, the following parameters are selected: C2, R1, R4 and R5. Thus the new secret data can be enciphered by the server 30 as follows:

Enciphered secret data=current secret data $\oplus$ new secret data $\oplus$ C2 $\oplus$ R1 $\oplus$ R4 $\oplus$ R5.

In the example of FIG. 1, the server 30 comprises a processor 80 which is able to send a message 85 to the credential container. The server 30 comprises a non-volatile memory 82 which stores the current secret data 76 (e.g. Ki) and the same set 77 as the credential container 20. The secret parameters are supposed to be uniquely allocated to the network operator and not shared with any third party.

It is to be noted that the set of secret parameters only depends on the network operator while the current secret data depends on the credential container.

The server 30 is configured to execute a symmetric mutual authentication algorithm using this set 77. Preferably, the symmetric mutual authentication algorithm is used to authenticate the credential container 20 when the credential container requests to access a communication network. The server 30 comprises a software provisioning agent 83 adapted to be run by the processor 80 for generating a new secret data 78 enciphered using both a subset 79 of the set 77 and another algorithm different from the symmetric mutual authentication algorithm. The provisioning agent 83 adapted is adapted to include the enciphered second secret data in the message 85.

In the above presented embodiments, the enciphering and deciphering algorithms take the current secret data 76 as input parameter. Alternatively, the server and the credential container may use a random value instead of the current secret data so that the one-time-pad has a value which is unique for each replacement operation. In this case, the server may send the random value to the credential container through the message 85.

In the above presented embodiments, the enciphering and deciphering algorithms are similar. Alternatively, they may be different. For instance, the enciphering and deciphering algorithms may be based on Public-key cryptography (also named asymmetric cryptography) that uses a pair of public and private keys.

It is to be noted that, the secret parameters of the selected subset may be combined to generate intermediate values which have a size greater than (or equal) the size of the secret data to be updated. For instance, the secret parameters C1 and C3 may be concatenated to generate an intermediate secret value having a length of 256 bits (i.e. 2×128 bits).

Figure 2A:
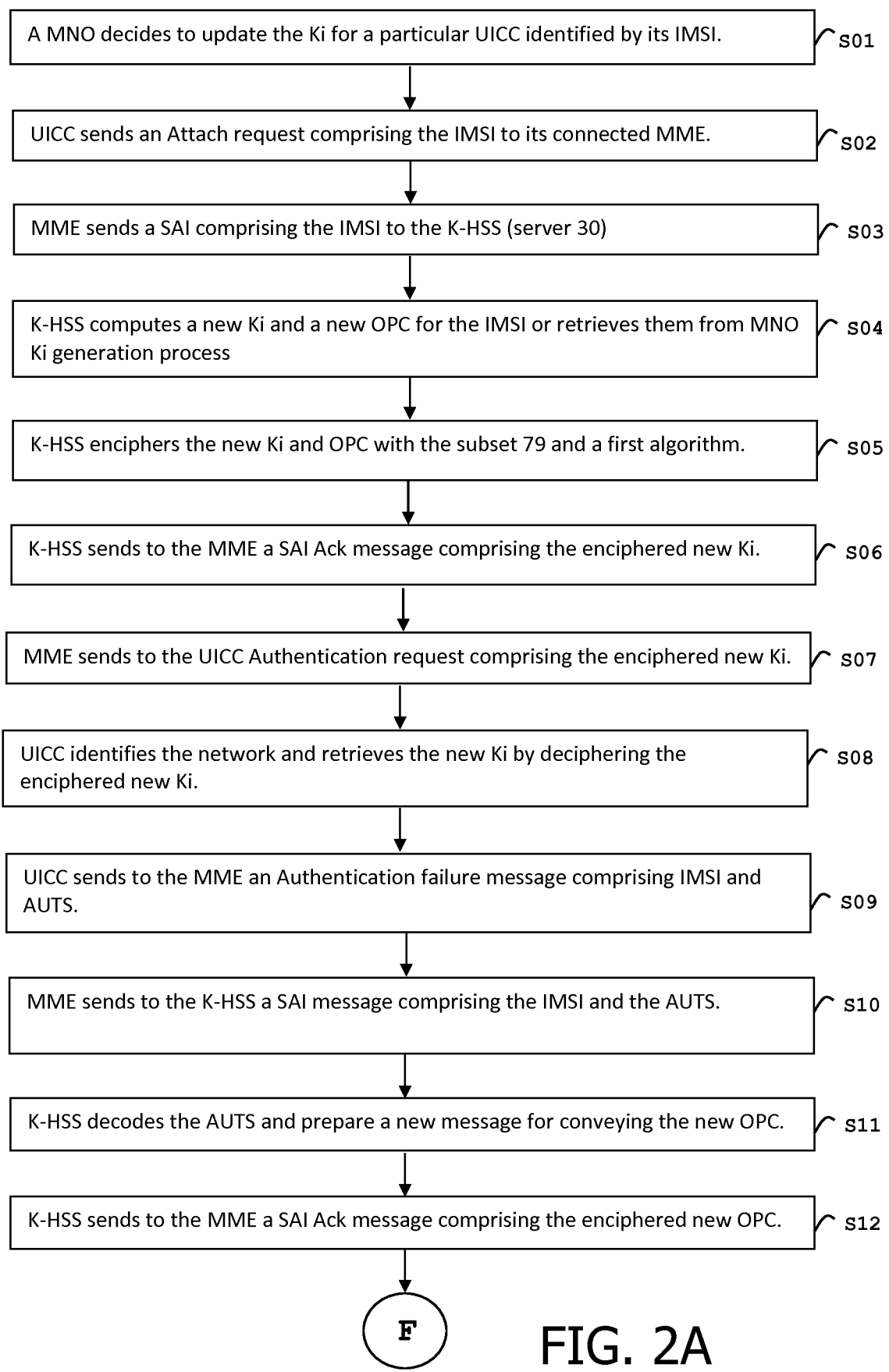
FIG. 2A shows a first part of a flow diagram for updating a secret data according to an example of the invention.
Figure 2B:
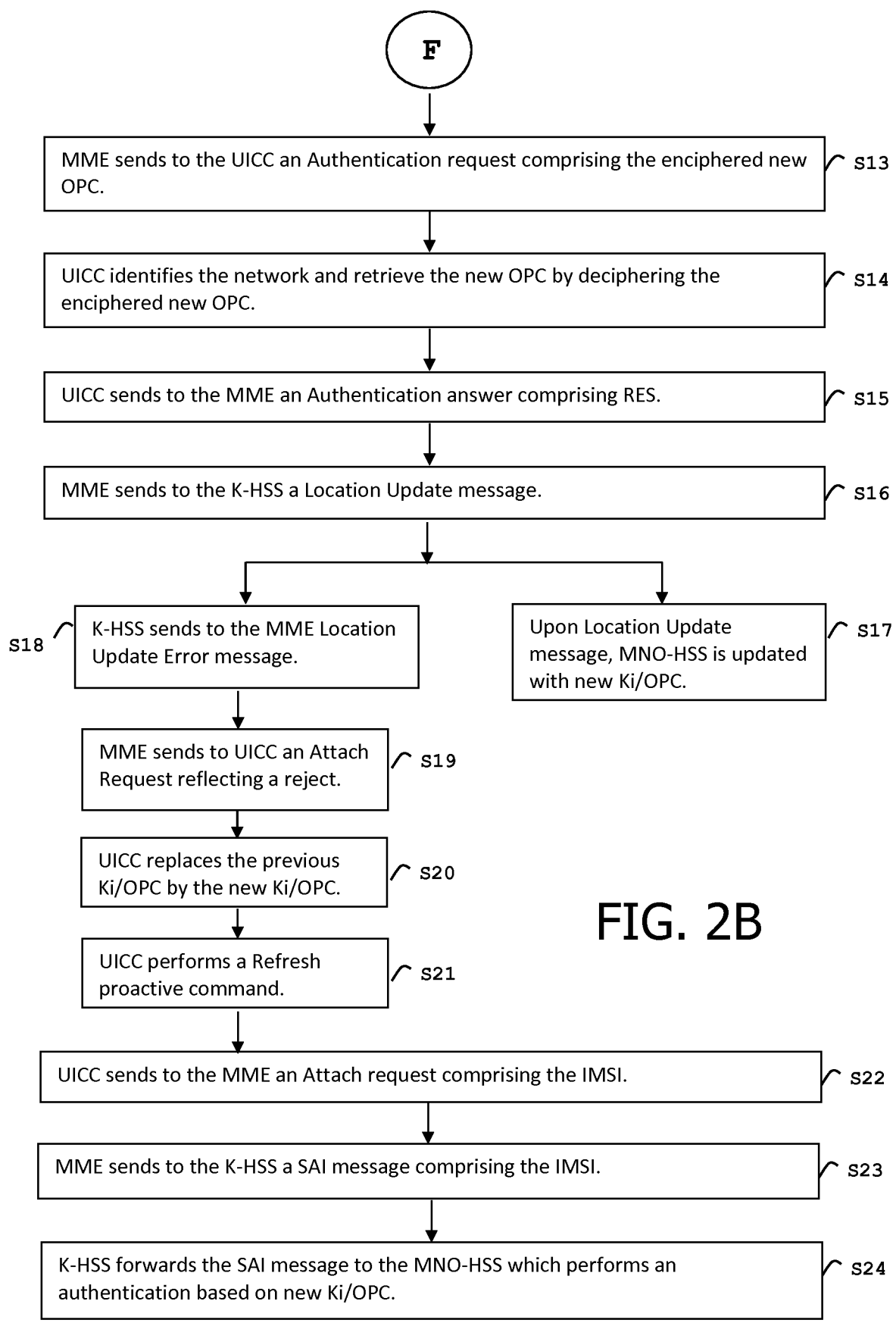
FIG. 2B shows a second part of a flow diagram for updating a secret data according to an example of the invention.

FIGS. 2A and 2B show a flow diagram for updating a secret data according to an example of the invention.

The credential container 20 is assumed to be pre-provisioned with an authentication key Ki, an OPC (as defined by ETSI TS 135.206 V9.0.0) and a set 77 of secret parameters defined for a symmetric mutual authentication algorithm like Milenage.

In this example, the server 30 comprises two elements: a K-HSS and a MNO-HSS. The MNO-HSS can be a conventional Home Subscriber Server (HSS) and the K-HSS may be a proxy HSS in charge of Ki management. In another embodiment, the K-HSS may be a conventional Home Subscriber Server connected to an Authentication center (AuC).

In another embodiment, the K-HSS and the MNO-HSS may be merged in a single server which acts as Authentication center (AuC).

At step 501, the mobile Network operator (MNO) which manages the subscription stored in the UICC 20 decides to update the authentication key Ki and the OPC for the UICC 20 which is identified by its IMSI (International Mobile Subscriber Identity).

At step S02, the UICC 20 sends an Attach request comprising its IMSI to its connected MME (Mobile Management Entity). The MME may be a smartphone for example).

The traffic for this IMSI is routed to K-HSS to initiate the Ki update. This routing is MNO triggered. Thus the MME sends a SAI (Send Authentication Information or MAP_SEND_AUTHENTICATION_INFO service) comprising the IMSI to the K-HSS (i.e. to server 30) at step S03. More details about SAI can be found in ETSI TS 129 002 [V10.2.0] for example.

At step S04, the K-HSS computes a new Ki and a new OPC allocated to the IMSI. Alternatively, it may retrieve them from another entity in charge of the MNO Ki generation.

At step S05, the K-HSS identifies the subset 79 and enciphers the new Ki and OPC with this subset 79 and a first algorithm like one-time-pad encryption for instance. Authentication parameter RAND field and Authentication parameter AUTN field of an Authentication Request frame are defined by ETSI TS 124.008. The RAND can be set with the enciphered new Ki and the AUTN is computed with this RAND. Preferably, a bit in the AMF (Authentication Management Field) includes a reference that triggers the command to update the Ki. More details about AMF can be found in ETSI TS 133.102.

At step S06, the K-HSS sends to the MME a SAI Ack message comprising the enciphered new Ki, the computed AUTN and the AMF. The SAI Ack message is sent upon receipt of the SAI by the K-HSS.

At step S07, on receipt of the SAI Ack message, the MME sends to the UICC an Authentication request comprising the enciphered new Ki, the computed AUTN and the AMF.

At step S08, on receipt of the Authentication request, the UICC identifies both the network and the subset 79. Then it retrieves the new Ki by deciphering the enciphered new Ki using the subset and a second algorithm like one-time-pad encryption for instance. Additionally, the UICC analyzes the received AMF to identify the target of the update command. (i.e. the Ki)

More details related to the management of Authentication request and network identification can be found at § 6.3.3 of ETSI TS 133.102 V3.6.0 for example.

Once the deciphering operation is complete, the UICC sends back an acknowledgment message in the synchronization token AUTS (i.e. AUTS parameter as detailed in ETSI TS 133 102) to continue the process. At step S09, the UICC sends to the MME an Authentication failure message comprising the IMSI and the AUTS. Preferably, the AUTS is set with the concatenation of the fourteen first bits of the enciphered Ki and the bits 5-18 of the ICCID (Integrated Circuit Card Identifier).

At step S10, upon receipt of the Authentication failure message, the MME sends to the K-HSS a SAI message comprising the IMSI and the AUTS.

At step S11, the K-HSS decodes the received AUTS message and validates the initial sender (i.e. the UICC 20). If the UICC is successfully validated, the K-HSS prepares a new message to convey the new OPC. Although the new OPC has been enciphered at step 05, it may be enciphered at step S11. The RAND can be set with the enciphered new OPC and the AUTN is computed with this RAND. Preferably, a bit in the AMF (Authentication Management Field) includes a reference that triggers the command to update the OPC.

At step S12, the K-HSS sends to the MME a SAI Ack message comprising the enciphered new OPC, the AUTN and the AMF.

As noted by the link "F", the sequence continues at FIG. 2B.

At step S13, upon receipt of the SAI Ack message, the MME sends to the UICC an Authentication request comprising the enciphered new OPC, the AUTN and the AMF.

At step S14, the UICC identifies the network and retrieves the new OPC by deciphering the enciphered new OPC using the subset 79 and the second algorithm. The UICC checks the content of the received AMF to identify the target of the update command. (i.e. the OPC)

It is to be noted that the subset used for enciphering/ deciphering the new OPC can be different from the subset used to enciphering/deciphering the new Ki.

At step S15, the UICC sends to the MME an Authentication answer comprising RES.

Details related to RES management can be found in TS 133.102.

At step S16, the MME sends to the K-HSS a Location Update message.

At step S17, upon Location Update message, the MNO-HSS is updated with new Ki/OPC. The new Ki/OPC are sent to the MNO-HSS which activates these new values.

At step S18, upon receipt of the Location Update message, the K-HSS sends to the MME Location Update Error message.

At step S19, upon receipt of the Location Update Error message the MME sends to the UICC an Attach Request reflecting a reject.

At step S20, upon receipt of the Attach Request reflecting a reject, the UICC replaces the previous pair (Ki,OPC) by the new pair (Ki,OPC).

At step S21, the UICC performs a Refresh proactive command. Thanks to the Refresh command performed in ad-hoc mode, a new boot sequence is performed. This leads to new attachment to network and authentication.

At step S22, the UICC sends to the MME an Attach request (as defined by ETSI TS 124.008) comprising the IMSI.

At step S23, the MME sends to the K-HSS a SAI message comprising the IMSI.

At step S24, the K-HSS forwards the SAI message to the MNO-HSS which performs an authentication based on new Ki/OPC. The authentication can succeed since both Ki and OPC have been updated in both sides: Server 30 and UICC 20.

The new Ki/OPC can be sent to the UICC by other protocols. For example, the server may send the new Ki/OPC through a conventional OTA channel or through a combination Internet/Wi-Fi.

The updating method of the invention can be used to update any keys stored in the credential container 20.

In particular, the invention allows to update the current secret data which is used to authenticate to a communication network. (i.e. current secret data used for secure communication between a credential container and a remote server).

The invention is well-suited for managing the provisioning of a fleet of credential containers.

The invention is well-suited for updating a secret data whose value may be compromised. In particular, assuming that the initial secret data to replace and the secret parameters of the algorithm have been provisioned through separate channels, the invention allows to securely update the initial secret data even if the channel used to provision the initial secret data has been hacked.

The described embodiments or examples may be combined.

The invention claimed is:

1. A method for updating a first secret data in a credential container including a subscriber identity module:
   wherein the first secret data is a subscriber authentication key uniquely assigned to the subscriber identity module;
   wherein said credential container comprises a set of secret parameters customized for a network operator; said secret parameters being specific to the network operator and distinct from the first secret data;
   wherein said credential container is configured to execute a first algorithm designed only to perform symmetric mutual authentication with a remote server using said set to authenticate to a communication network, wherein all secret parameters of said set are initially provided only for execution of the first algorithm by the credential container; and
   wherein the credential container receives from the remote server a second secret data enciphered by using a second algorithm which is an enciphering algorithm and a subset of said secret parameters; and
   wherein the credential container deciphers the enciphered second secret data by using both the subset and a third algorithm which is a deciphering algorithm and replaces the first secret data with the second secret data.

2. The method according to claim 1, wherein the first algorithm is the Milenage algorithm as defined by ETSI TS 135.206 or the TUAK algorithm as defined by ETSI TS 135.231.

3. The method according to claim 1, wherein said second and third algorithms are identical.

4. The method according to claim 1, wherein the second algorithm takes g new value of the first secret data as input parameter for generating the enciphered second secret data.

5. The method according to claim 1, wherein the second algorithm is based on a one-time-pad encryption.

6. The method according to claim 5, wherein the first secret data is used as a mask applied on the set to identify the subset.

7. The method according to claim 1, wherein the credential container comprises an IMSI which is a unique identifier of a telecom subscription and a key, Ki, which is a secret key uniquely allocated to the telecom subscription;
   wherein the credential container sends an Attach request comprising said IMSI to a Mobile Management Entity, MME;
   wherein the MME sends a Send Authentication Information, SAI, comprising the IMSI to a server comprising a Home Subscriber Server, MNO-HSS, and a proxy Home Subscriber Server, K-HSS, in charge of Ki key management;
   wherein the K-HSS identifies a new Ki key allocated to the IMSI;
   wherein the K-HSS identifies said subset and enciphers the new Ki key with said subset and said second algorithm;
   wherein the K-HSS sets a Authentication parameter field, RAND as defined by ETSI TS 124.008, with the enciphered new Ki key and sends to the MME a SAI Ack message comprising the RAND;
   wherein, on receipt of the SAI Ack message, the MME sends to the credential container an Authentication request comprising the RAND; and
   wherein, on receipt of the Authentication request, the credential container identifies said subset, then retrieves the new Ki by deciphering the enciphered new Ki key using said subset and said second algorithm.

8. The method according to claim 7, wherein the credential container sets a parameter AUTS, as detailed in ETSI TS 133 102, with a concatenation of bits of the enciphered Ki key and the bits of an identifier, ICCID, of the credential container, then sends to the MME an Authentication failure message comprising said IMSI and AUTS;
   wherein, upon receipt of the Authentication failure message, the MME sends to the K-HSS a SAI message comprising the IMSI and the AUTS; and
   wherein the K-HSS decodes the received AUTS message and after successfully validating the initial sender using said bits of the ICCID, the K-HSS sends to the credential container a new OPC, as defined by ETSI TS 135.206, in a way similar to that of the new Ki key.

9. The method according to claim 8, wherein the credential container sends to the MME an Authentication answer and the MME sends to the K-HSS a Location Update message;
   wherein, upon Location Update message, the MNO-HSS activates these new Ki key and new OPC then sends to the MME a Location Update Error message;
   wherein, upon receipt of the Location Update Error message, the MME sends to the credential container an Attach Request reflecting a reject; and wherein, upon receipt of the Attach Request reflecting a reject, the credential container activates the new Ki key and new OPC.

10. A credential container comprising a processor and a first secret data and able to receive a message from a remote server:
   wherein said credential container includes a subscriber identity module and comprises a set of secret parameters customized for a network operator, said secret parameters being specific to the network operator and distinct from the first secret data;
   wherein the first secret data is a subscriber authentication key uniquely assigned to the subscriber identity module;
   wherein said credential container being configured to execute a first algorithm designed only to perform symmetric mutual authentication with the remote server using said set to authenticate to a communication network; all secret parameters of said set being initially provided only for execution of first algorithm by the credential container; and
   wherein said message comprises a second secret data enciphered by using both a subset of said secret parameters and a second algorithm which is an enciphering algorithm, and wherein the credential container comprises an updating agent adapted to be run by the processor for deciphering the enciphered second secret data by using both the subset and a third algorithm which is a deciphering algorithm and replacing the first secret data with the second secret data.

11. The credential container according to claim 10, wherein first algorithm is the Milenage algorithm as defined by ETSI TS 135.206 or the TUAK algorithm as defined by ETSI TS 135.231.

12. The credential container according to claim 10, wherein the second algorithm takes a new value of the first secret data as input parameter for generating the enciphered second secret data.

13. The credential container according to claim 10, wherein the second algorithm is based on a one-time-pad encryption.

14. The credential container according to claim 10, wherein the credential container is a Subscriber Identity Module (SIM), a Universal Integrated Circuit Card (UICC), a embedded secure element (eUICC) or an integrated secure element (iUICC).

15. A server comprising a hardware processor and a non-volatile memory and able to send a message to a credential container including both a subscriber identity module and a first secret data:
   wherein the first secret data is a subscriber authentication key uniquely assigned to the subscriber identity module;
   wherein said server comprises a set of secret parameters customized for a network operator; said secret parameters being specific to the network operator and distinct from the first secret data;
   wherein said server is configured to execute a first algorithm designed only to perform symmetric mutual authentication with the credential container using said set to allow said credential container to authenticate to a communication network; all secret parameters of said set being initially provided only for execution of the first algorithm by the server; and,
   wherein said server comprises a provisioning agent adapted to be run by the processor for generating a second secret data enciphered by using both a subset of said secret parameters and a second algorithm which is an enciphering algorithm and for including the enciphered second secret data in said message, said second secret data being intended to replace the first secret data in the credential container.

16. The server according to claim 15, wherein first algorithm is the Milenage algorithm as defined by ETSI TS 135.206 or the TUAK algorithm as defined by ETSI TS 135.231.

17. The server according to claim 15, wherein the second algorithm is based on a one-time-pad encryption.

* * * * *